Sept. 30, 1947.  L. W. SCHAAFF  2,428,341
LOCKING MEANS
Filed Aug. 30, 1944
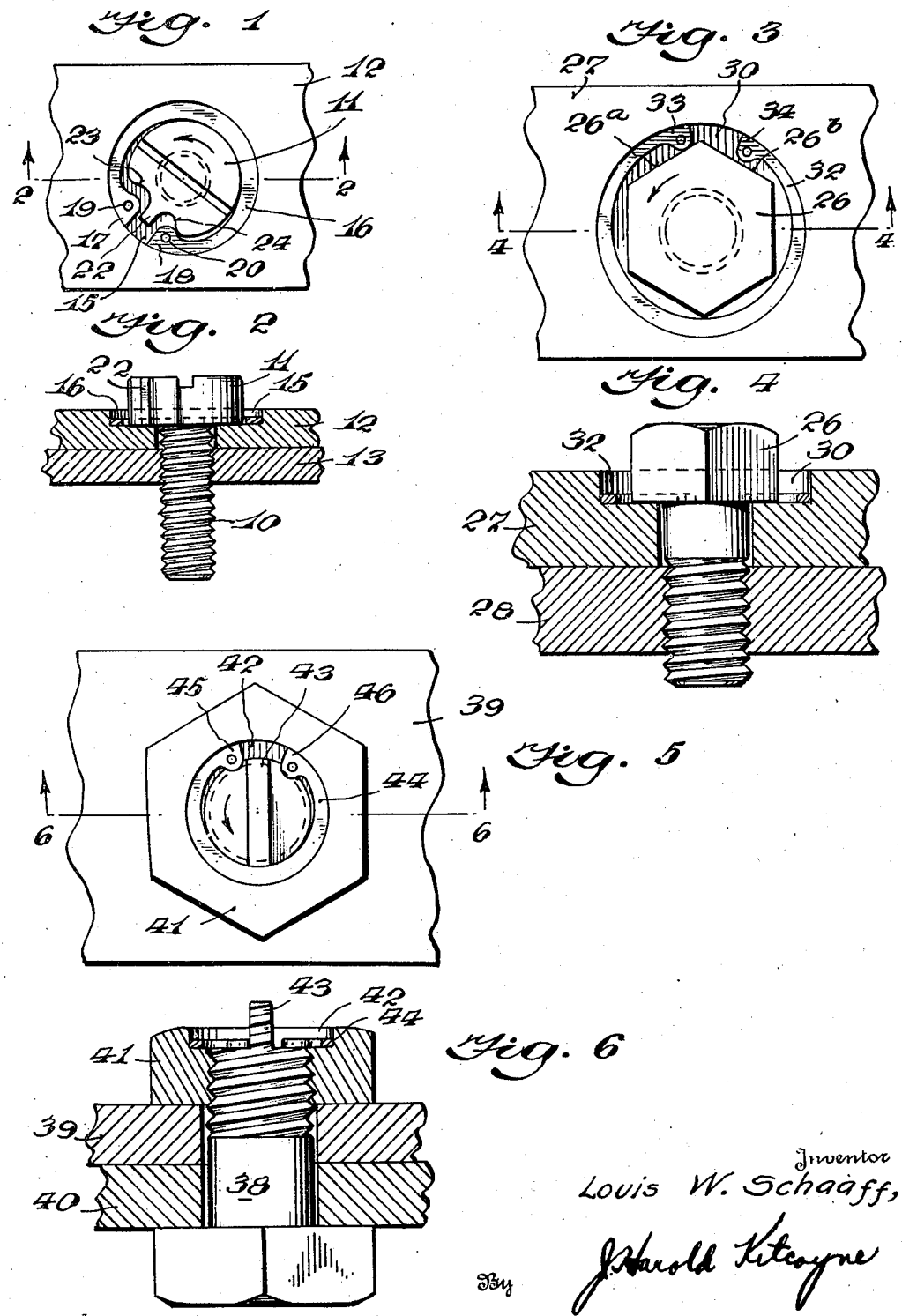
Inventor
Louis W. Schaaff,
By J. Harold Kitcoyne
Attorney Patented Sept. 30, 1947

2,428,341

UNITED STATES PATENT OFFICE 2,428,341

LOCKING MEANS

Louis W. Schaaff, Jackson Heights, N. Y., assignor to Waldes Koh-I-Noor, Inc., Long Island City, N. Y., a corporation of New York Application August 30, 1944, Serial No. 551,904

7 Claims. (Cl. 151—32)

1

This invention relates to improvements in locking means of the type adapted to secure a rotatable part such as a screw, bolt, nut and the like against rotation relative to a fixed part, and in its more specific aspects to a ring-type friction lock for securing parts as aforesaid against relative rotation.

It is well known to use locking means employing an open spring ring having one end operatively connected with the one part and the other end operatively connected with the other part to be secured against relative rotation. Usually, such a ring performs its locking function by having its ends disposed so that one end holds one part against rotation and its other end holds the second part against rotation. However, locking means employing an open spring ring as aforesaid are open to the objection that a definite positioning of the parts to be locked against relative rotation is required, so that the ring ends can function as described, and moreover special recesses formed in one or both of the parts to be locked are required for the ends of the locking ring.

Stated broadly, the object of the present invention is to provide a simple and effective friction lock for securing a part such as a screw, nut, bolt or the like, against rotation relative to another usually fixed part, in which the locking effect is independent of the relative position of said parts and/or of the position of the locking member relative to one of the parts to be locked, for example, the fixed part. It is a further object of the invention to simplify the construction of ring-type locking means as heretofore known by the provision of an improved locking means employing an open-ended spring ring which operates through friction to secure the parts against relative rotation and which thus requires no special recessing of the parts enabling them to receive the ring ends as heretofore required. Yet another object of the invention is to provide a locking means for securing parts against relative rotation which employs a friction locking ring of relatively inexpensive manufacture which can be readily applied to or removed from the parts to be locked without permanent distortion and which, when assembled in its locking relation, provides a rugged, durable and effective locking assembly.

Other objects will be in part obvious and in part hereinafter pointed out in connection with the following analysis of the invention wherein are illustrated in detail preferred embodiments of the invention selected for the purpose of simple description.

In the drawings—

Fig. 1 is a plan view of locking means according to the invention for locking cylindrically headed screw bolt against rotation relative to an associated fixed part;

Fig. 2 is a section along line 2—2 of Fig. 1, the screw being shown in elevation;

Figs. 3 and 4 are views corresponding to Figs. 1 and 2, showing the locking means of the invention applied as a lock for a bolt having a head of hex formation;

Fig. 5 is a plan view of modified locking means according to the invention applied to a nut and bolt assembly;

Fig. 6 is a section along line 6—6 of Fig. 5, the bolt being shown in elevation.

In the drawings, wherein like reference characters designate like parts throughout the several views, reference character 10 (Figs. 1 and 2) designates a screw bolt having a cylindrical head 11 positioned to secure together the plates 12 and 13, it being understood that the plates 12, 13 together are typical of a part relative to which the screw bolt 10 is secured against rotation by the locking means of the present invention. As shown, the cylindrical head 11 seats in a countersunk recess 15, defined by a cylindrical wall which is formed in the fixed plate (plate 12), the recess being of somewhat larger diameter than the screw head 11 and being concentric therewith.

According to the invention, a locking member 16 disposed in the recess 15 about the head 11 functions to frictionally lock the head and hence the screw against rotation relative to the part 12. Such locking member is preferably in the form of an open-ended spring ring whose outer periphery defines the major arc of a circle and which is tapered in such manner that the section heights thereof decrease progressively from its mid-section to the ends thereof, whereby the ring is adapted to maintain its outer-edge circularity under deformation as when spread or compressed, for example. To facilitate handling of a ring as aforesaid, it is provided at its open ends with apertured ears 17, 18, the apertures 19, 20 thereof being adapted to receive the points of a plier-type tool for compressing the ring in the assembly and disassembly thereof.

As shown, the screw head 11 is formed with an abutment surface which in the illustrated construction takes the form of an axial edge rib 22 which is adapted to extend radially into the gap or slot between the open ends of the ring 16, head recesses 23, 24 being disposed to the sides thereof for receiving the ears 17, 18 of the locking ring with suitable clearance.

It will be understood that the effective diameter of the ring 16 is such that when the ring is sprung into the recess 15, it expands against the circular wall thereof with sufficient friction as normally to hold itself within said recess solely by friction. Moreover, due to the property of the ring in maintaining circularity under deformation, the expanded ring exerts substantial pressure against the recessed wall equally throughout its circumference. Thus, to assemble the ring, it is merely necessary to compress the ring to a diameter such that it can be slipped over the screw head 11, with its open ends being disposed to the sides of the head rib 22 and into the recess 15. Upon release, the resiliency of the ring causes it to frictionally secure itself to the circular wall of the recess.

By reference to Fig. 1 illustrating the assembled position of the locking ring, it will be observed that rotation of the screw and its head 11 in the direction of the arrow causes the head rib 22 to engage against the ring ear 18 with a tendency to spread the ring. Inasmuch as any spreading of the ring causes the latter to engage the wall recess 15 with increased friction, it will be appreciated that the head is frictionally secured against rotation as indicated. A limited reverse rotation of the head results in engagement of rib 22 with the ring ear 17, with a similar tendency to spread the ring, thus to increase its friction against the recess wall 15. Hence, the screw is frictionally secured against any substantial rotation in the opposite direction also.

When it is desired to unthread the screw 10, for example, to disassemble the screw from plates 12 and 13, the ring is compressed by inserting the points of a plier type handling tool into the ear apertures 19, 20 and the ring is thereupon lifted from the recess 15, whereupon the screw may be freely rotated.

Substantially the same form of locking means is illustrated in Figs. 3 and 4 applied to a bolt having a hex head 26. As shown, the bolt functions to secure together the plates 27, 28 although it will be understood that the bolt may be threaded into other or equivalent parts, relative to which it is desired to lock the bolt against rotation. The relatively fixed part (plate 27) is provided with a countersunk recess 30 of somewhat larger diameter than the major diameter of the head, for seating the tapered spring ring 32 corresponding to the tapered locking ring 16 previously described, formed at its open ends with aperture ears 33, 34 to facilitate handling thereof.

In assembly, the ring is sprung into the recess 30 in position so that its ears 33, 34 engage against one of the adjacent flats of the bolt head 26 which form a plurality of abutment surfaces thereon. Thus, assuming rotation of the head 26 in the direction of the full line arrow (Fig. 3), the inclined flat 26a of the head engages ring ear 33 tending to spread the ring, with the result that the ring grips the recess wall with increased friction, thereby to secure the head against any substantial rotation. Upon rotation of the head in the opposite direction, the inclined flat 26b of the head engages against ring ear 34 and in similar manner causes the ring to grip against the recess wall with increased friction. Accordingly the bolt is secured against any substantial rotation in either direction relative to plate 27.

In the modification shown in Figs. 5 and 6, illustrating locking means according to the invention applied to a nut and bolt assembly, the bolt 38 there shown operates to secure together the plates 39, 40, a nut 41 being threaded on to the shank of the bolt. To secure the nut and bolt against relative rotation, the open or outer end of the nut is countersunk to provide a circular recess 42 into which a diametrically extending abutment rib 43 formed on the shank end of the bolt is adapted to project. A tapered ring 44 corresponding to the rings 16 and 32 of the prior modifications is sprung into the recess 42, and positioned therein so that the rib 43 projects into the slot or gap between the apertured ears 45, 46 provided at the open ends of the ring.

By reference to Fig. 5, it will be seen that rotation of the nut 41 relative to the bolt 38 in the direction of the arrow results in engagement between the bolt rib 43 and the ring ear 45, as tends to spread the ring and thereby increase its friction against the wall of the nut recess 42. Reverse rotation of the nut results in engagement between the bolt rib 43 and ear 46 of the locking ring, which in similar manner tends to spread the latter and increase its friction against the recess wall of the nut. Accordingly, it will be seen that relative rotation between the nut 41 and its bolt 38 is precluded by the friction locking effect of spring ring 44.

While a locking ring as aforesaid normally engages against the surrounding wall of the recess with sufficient friction as to restrain the ring against axial displacement, it may be advisable under some conditions, for example where the locked assembly is subjected to excessive vibration, to secure the ring so that it cannot axially shift out of its recess. Under such conditions, it is possible to provide an undercut groove at the base of the recesses 15, 30 and 42, into which the locking rings can be sprung, so that an axial shifting of the ring out of the recess even under conditions of excessive vibration is positively prevented, while at the same time the ring is capable of being readily assembled and disassembled as aforesaid.

From the foregoing, it will be obvious that with locking means according to the invention, it is not necessary to provide special means in the ring receiving recess for engaging with the ring ends, or for positively engaging the ring ends either with the rotatable or the fixed part of the locking assembly, because the ring is effectively held by its friction against the recess wall. On the other hand, the locking means of the invention achieves a friction lock between a rotatable part and a related relatively fixed part which is characterized by an increase in the friction locking effect with rotation of the rotatable part. At the same time the locking means as described is of the type that may be readily disassembled without the danger of distorting or deforming the locked parts or the locking ring as would prevent their re-use or re-assembly. Moreover, the invention provides locking means of inexpensive yet durable construction and at the same time one that can be assembled and disassembled with the minimum of time and effort.

As many changes could be made in carrying out the above constructions without departing from the scope of the invention, it is intended that all matter contained in the above description or shown in the accompanying drawings shall be interpreted as illustrative and not in a limiting sense.

I claim:

1. In a locking assembly of the character described, the combination of a rotatable part, a fixed part, one of said parts having a countersunk recess, the other part extending into said recess and being provided with abutment surfaces, and an open-ended spring ring whose outer periphery defines the major arc of a circle spring-seated in the recess and being secured therein solely by the tight frictional engagement of its outer edge with the circular wall of said recess, said abutment surfaces extending into the gap between the open ends of said ring, the relation of said surfaces to ring ends being such that relative rotation of said parts results in an abutment surface engaging against one or the other ring ends and a consequent spreading of the ring into tighter frictional engagement with the recess wall.

2. A locking assembly as set forth in claim 1, wherein the ring is tapered from its mid section to its free ends, so that it maintains circularity under deformation.

3. A locking assembly as set forth in claim 1, wherein the ring is tapered from its mid section to its free ends so as to maintain circularity under deformation whereby in its contracted state the ring has tight frictional engagement with the recess wall throughout its full circumference, and wherein the ring ends are formed as ears provided with apertures adapted to receive the working points of a ring handling tool.

4. In a locking assembly of the character described, the combination of a rotatable screw-threaded part having a head, a fixed part into which said first part is threaded and having a countersunk recess into which the head of the first part extends, and an open-ended spring ring whose outer periphery defines the major arc of a circle spring-seated in the recess and being secured therein solely by the tight frictional engagement of its outer edge with the circular wall of said recess, the head being formed to provide abutment surfaces which extend into the gap between the open ends of the ring, the relation of said surfaces to ring ends being such that rotation of the rotatable part relative to the fixed part results through engagement of an abutment surface with one or the other of the ring ends in spreading of the ring and a consequent tighter frictional engagement thereof with the recess wall.

5. In a locking assembly of the character described, the combination of a rotatable screw-threaded part having a head, a fixed part into which said first part is threaded and having a countersunk recess into which the head of the first part extends, and an open-ended spring ring spring-seated in the recess and being secured therein solely by the tight frictional engagement of its outer edge with the circular wall of said recess, the head being formed with a radial rib which extends into the gap between the open ends of the ring, the relation of the rib to ring ends being such that rotation of the rotatable part with its head and rib effects spreading of the ring into tighter frictional engagement with the recess wall through engagement of the rib with one or the other of the ring ends.

6. In a locking assembly of the character described, the combination of a rotatable screw-threaded part having a head, a fixed part into which said first part is threaded and having a countersunk recess into which the head of the first part extends, and an open-ended spring ring spring-seated in the recess and being secured therein solely by the tight frictional engagement of its outer edge with the circular wall of said recess, the head having angularly related flat surfaces which extend into the gap between the open ends of the ring, the relation of said angularly related flat surfaces to ring ends being such that rotation of the rotatable part and its head effects spreading of the ring into tighter frictional engagement with the recess wall through engagement of said surfaces with one or the other of the ring ends.

7. A locking nut assembly comprising the combination of a bolt having a threaded shank provided at its free end with a rib, a nut threaded on to said shank, the nut being provided with a countersunk recess into which said rib projects, and an open-ended spring ring spring-seated in the recess with its outer edge having tight frictional engagement with the circular wall of said recess, said rib extending into the gap between the open ends of the ring and being operative, upon relative rotation of nut and bolt, to engage against one or the other of the ring ends thereby to effect spreading of the ring into tighter frictional engagement with the recess wall.

LOUIS W. SCHAAFF.

REFERENCES CITED

The following references are of record in the file of this patent:

UNITED STATES PATENTS

| Number | Name | Date |
| --- | --- | --- |
| 718,776 | Levy | Jan. 20, 1903 |
| 771,139 | Fudge | Sept. 27, 1904 |
| 1,235,205 | Kierstead | July 31, 1917 |
| 1,328,399 | Reddy | Jan. 20, 1920 |
| 1,339,015 | Blake | May 4, 1920 |
| 1,711,861 | Stallard | May 7, 1929 |
| 1,758,515 | Heiermann | May 13, 1930 |
| 2,131,948 | Graham | Oct. 4, 1938 |
| 2,203,219 | Jackman | June 4, 1940 |
| 2,400,318 | Rosan | May 14, 1946 |

OTHER REFERENCES

Ser. No. 411,076, Jacob (A. P. C.), published May 11, 1943.